US008166104B2

(12) United States Patent
Shein et al.

(10) Patent No.: US 8,166,104 B2
(45) Date of Patent: Apr. 24, 2012

(54) CLIENT-CENTERED USAGE CLASSIFICATION

(75) Inventors: Barak Shein, Sazyon (IL); Kfir Karmon, Tel Aviv (IL); Eran Yariv, Zichron (IL); Roy Varshavsky, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 12/406,964

(22) Filed: Mar. 19, 2009

(65) Prior Publication Data

US 2010/0241687 A1 Sep. 23, 2010

(51) Int. Cl.
G06F 15/16 (2006.01)
G06Q 30/00 (2006.01)
(52) U.S. Cl. .................. 709/203; 705/14.49; 705/14.53
(58) Field of Classification Search .......... 709/223–224, 709/201–203; 726/26; 705/14.49–14.67; 707/754
See application file for complete search history.

(56) References Cited

U.S. PATENT DOCUMENTS

| | | | |
|---|---|---|---|
| 6,029,195 A | | 2/2000 | Herz |
| 6,256,664 B1* | | 7/2001 | Donoho et al. ............... 709/204 |
| 6,611,881 B1* | | 8/2003 | Gottfurcht et al. ............ 710/18 |
| 6,853,998 B2 | | 2/2005 | Biebesheimer et al. |
| 7,069,427 B2 | | 6/2006 | Adler et al. |
| 7,353,246 B1* | | 4/2008 | Rosen et al. ................... 709/202 |
| 2001/0036224 A1* | | 11/2001 | Demello et al. ............... 375/220 |
| 2001/0047297 A1 | | 11/2001 | Wen |
| 2001/0049620 A1 | | 12/2001 | Blasko |
| 2002/0055912 A1 | | 5/2002 | Buck |
| 2002/0152284 A1 | | 10/2002 | Cambray et al. |
| 2003/0004898 A1 | | 1/2003 | McAuliffe et al. |
| 2004/0088219 A1 | | 5/2004 | Sanders et al. |
| 2004/0203958 A1 | | 10/2004 | Trevathan |
| 2004/0210820 A1 | | 10/2004 | Tarr et al. |
| 2005/0022031 A1 | | 1/2005 | Goodman et al. |
| 2005/0132014 A1 | | 6/2005 | Horvitz et al. |
| 2005/0144158 A1 | | 6/2005 | Capper et al. |
| 2005/0171839 A1 | | 8/2005 | Corriere |
| 2006/0026067 A1 | | 2/2006 | Nicholas et al. |
| 2006/0026114 A1 | | 2/2006 | Gregoire et al. |
| 2006/0136985 A1 | | 6/2006 | Ashley et al. |
| 2006/0271425 A1 | | 11/2006 | Goodman et al. |
| 2007/0005419 A1* | | 1/2007 | Horvitz et al. .................. 705/14 |
| 2007/0112742 A1* | | 5/2007 | Dumais et al. .................... 707/3 |
| 2007/0143860 A1 | | 6/2007 | Hardt |
| 2007/0162292 A1 | | 7/2007 | Bell et al. |
| 2007/0266025 A1* | | 11/2007 | Wagner et al. .................... 707/7 |
| 2007/0266079 A1 | | 11/2007 | Criddle et al. |
| 2007/0282678 A1 | | 12/2007 | Dendi et al. |
| 2008/0000964 A1 | | 1/2008 | Flake et al. |
| 2008/0004951 A1* | | 1/2008 | Huang et al. .................... 705/14 |

(Continued)

OTHER PUBLICATIONS

"Burst Media Privacy Statement", retrieved at <<http://www.burstmedia.com/isl/privacy.asp>>, Dec. 5, 2008, pp. 5.

(Continued)

Primary Examiner — Brendan Higa
(74) Attorney, Agent, or Firm — Jared S. Goff (57) ABSTRACT

User input actions from one or more user input devices can be received, and unfiltered user input information about the user input actions can be collected at a client computing environment. The unfiltered user input information can be filtered to produce filtered user input information. The filtered user input information can exclude personal information and include non-personal information. In addition, a user profile can be created using the filtered user input information.

18 Claims, 5 Drawing Sheets

Software 180 Implementing Client-Centered Usage Classification

U.S. PATENT DOCUMENTS

| | | | |
|---|---|---|---|
| 2008/0082467 A1 | 4/2008 | Meijer et al. | |
| 2008/0208852 A1* | 8/2008 | Kuttikkad et al. | 707/6 |
| 2008/0281672 A1 | 11/2008 | Mangers et al. | |
| 2008/0281809 A1 | 11/2008 | Anderson et al. | |
| 2009/0055267 A1 | 2/2009 | Roker | |
| 2009/0197616 A1* | 8/2009 | Lewis et al. | 455/456.1 |

OTHER PUBLICATIONS

Sheika, Meyar, "Delicate Balance: Privacy and Personalization", retrieved at <<http://multichannelmerchant.com/lists/online_content_privacy_0324/>>, Mar. 24, 2008, pp. 3.

Kang, In-Ho, "Transactional Query Identification in Web Search", retrieved at <<http://www.cs.cmu.edu/~ihkang97/papers/transactional.pdf>>, Mar. 26, 2007, pp. 14.

"Privacy Policy", retrieved at <<http://ahnetworks.com/privacy_policy.php>>, Feb. 3, 2009, pp. 2.

"On-Line Privacy Policy", retrieved at <<http://www.songvault.fm/privacy.htm>>, May 21, 2007, pp. 2.

Jakobsson, et al., "Privacy-Preserving History Mining for Web Browsers", retrieved at <<http://w2spconf.com/2008/papers/sp3.pdf>>, May 22, 2008, pp. 10.

Claessens, et al., "A Secure and Privacy-Preserving Web Banner System for Targeted Advertising", retrieved at http://www.cosic.esat.kuleuven.be/publications/article-824.pdf>>, Electronic Commerce Research—Aug. 2003, pp. 1-31.

Emekci, et al., "Privacy Preserving Query Processing using Third Parties", retrieved at <<http://ieeexplore.ieee.org/stamp/stamp.jsp?arnumber=01617395>>, Proceedings of the 22nd International Conference on Data Engineering (ICDE'06), 2006, pp. 10.

Shapiro, et al., "A Privacy-Preserving 3rd-Party Proxy for Transactions that use Digital Credentials", retrieved at <<http://ieeexplore.ieee.org/stamp/stamp.jsp?arnumber=04232907>>, IEEE, 2007, pp. 970-973.

"Share Data", retrieved at <<http://www.lookery.com/data/share/>>, Feb. 11, 2009, p. 1.

"Selling Your Personal Data", retrieved at http://news.cnet.com/Selling-your-personal-data/2030-1069_3-5068504.html>>, Sep. 1, 2003, pp. 4.

Balfanz, et al., "Proactive Data Sharing to Enhance Privacy in Ubicomp Environments", retrieved at <<http://www.cs.cmu.edu/~jasonh/courses/ubicomp-sp2007/papers/05-proactive-data-sharing-ubicompprivacy.pdf>>, Aug. 27, 2004, pp. 7.

Lukose, et al., "DataBank: An Economics Based Privacy Preserving System for Distributing Relevant Advertising and Content", retrieved at <<http://www.hpl.hp.com/techreports/2006/HPL-2006-95.pdf>>, Jun. 26, 2006, pp. 11.

"MySpace Breaks Down Data Sharing Walls", retrieved at <<http://www.crn.com/networking/207601592>>, May 9, 2008, pp. 5.

Yariv, Eran, et al., User Information Brokering, Filed Apr. 14, 2009, U.S. Appl. No. 12/423,026, pp. 1-24 & Sheets 1-6.

Karmon, Kfir, et al., Embedded Content Brokering and Advertisement Selection Delegation, Filed Apr. 7, 2009, U.S. Appl. No. 12/419,322, pp. 1-38 & Sheets 1-11.

"International Search Report", Mailed Date: Sep. 30, 2010, Application No. PCT/US2010/026719, Filed Date: Mar. 9, 2010, pp. 9. (MS# 326589.02).

* cited by examiner

CLIENT-CENTERED USAGE CLASSIFICATION

BACKGROUND

Many users spend a great deal of time interacting with others over global communications networks such as the Internet. In doing so, users can engage in many interactions that indicate their personal interests, especially when conducting searches. Furthermore, users' online behavior can allow others to personally identify them by analyzing server side records, without users' consent or knowledge. This can create privacy concerns, which can be amplified when an ad network syndicating advertisements across a plethora of websites collects data about users from all affiliate sites, and can extract personal identifiable information and other information that users of these sites would not want revealed. Further yet, this information can be combined with search information to uncover users' specific interests and intent along with their online behavior patterns.

Some browsers have addressed users' privacy concerns by including optional privacy browsing modes. Among other things, these modes typically prevent cookies from being stored on client machines. However, this prevents users from benefiting from the convenient features that cookies can provide, such as persistence and automatic login to websites. In addition, such modes do not conceal some user information, such as a user's IP address, from ad networks, search engines, and other services.

Some server-side services have provided cookie-based opt-outs. In such schemes, an opt-out cookie is stored on a user's client machine, indicating that the user does not wish to be tracked by the server-side service. However, such cookies can be inadvertently deleted when a user deletes other browsing cookies. In addition, the user is still not in control of the server-side service's actions, and the server side service still has a motive to track the user to obtain the user's information. Moreover, the lack of tracking can prevent the user from benefiting from targeted information that a server-side service could provide to the user.

Some server-side services do periodic server side cleansing or expiration of server logs. However, the users do not control the cleansing and expiration, and the server-side services still keep the user's information until it is deleted according to a cleansing or expiration scheme. In addition, such expiration and cleansing can diminish the server-side service's ability to use targeting to provide useful information to the user.

SUMMARY

Whatever the advantages of previous online privacy protection tools and techniques, they have neither recognized the client-centered online usage classification tools and techniques described and claimed herein, nor the advantages produced by such tools and techniques.

In one embodiment, the tools and techniques can include receiving user input actions from one or more user input devices and collecting user input information about the user input actions at a client computing environment. The user input information can be filtered to produce filtered user input information at the client computing environment. The filtered user input information can exclude personal information and include non-personal information. In addition, a user profile can be created using the filtered user input information.

In another embodiment of the tools and techniques, user input information can be collected at a client computing environment and stored in one or more storage devices in the client computing environment. The user input information can represent user input actions received from one or more user input devices in the client computing environment. The user input information can be classified at the client computing environment to create an initial user profile, and the initial user profile can be obfuscated to create an obfuscated user profile. The obfuscated user profile can be sent from the client computing environment to a server computing environment.

In yet another embodiment of the tools and techniques, one or more storage devices can store user input information representing user input actions received from one or more input devices. In addition, stored user input information can be classified, and personal user input information can be prevented from being used in classifying the stored user input information.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Described embodiments are directed to techniques and tools for improved protection of online privacy and targeting of online services. Such improvements may result from the use of various techniques and tools separately or in combination.

Such techniques and tools may include collecting unfiltered user input information about user input actions at the client computing environment. That user input information may be stored in one or more storage devices in the client computing environment, and the information can be classified to create a user profile. However, the unfiltered (i.e., not yet filtered to exclude personal information) user input information can be filtered before being classified so that personal information can be excluded from use in the classification.

The profile can be sent to a server-side service so that the service can provide personalized content, such as targeted advertisements, to the user. Thus, the server-side service does not have access to the user's user input information. Moreover, the personal information can be excluded from the classification so that the user profile will not reflect the personal information. In addition to or instead of filtering personal information from the user input information, the user profile can be obfuscated to mask the user's true profile from the server-side service, and the user's computing environment can de-obfuscate personalized content received from the service before presenting the content to the user. Despite these privacy protections, the service can still provide personalized content to the user. Accordingly, the server-side service may have a decreased motivation to track the user. Indeed, the server-side service may agree to abstain from tracking the user in exchange for the user providing the user profile upon request.

As used herein, a user input action includes one or more actions input by a user through one or more user input devices to trigger an event in a computing environment. A user input action can also result in a message (e.g., a HTTP message) being passed to some other computing environment, such as a message sent over a global computer network. For example, user input actions could include actions resulting from using a keyboard to enter a search string to be passed to a search engine over a global computer network, or using a mouse to position a cursor over a displayed hyperlink and clicking on the hyperlink to navigate to an associated webpage. User input actions can be represented by user input information, which can include user action representations, such as tuples indicating events triggered by user input actions (e.g., {Navigation, http://www.msn.com, Sep. 9, 2008 8:30 am}; {Search, 'fast cars', Sep. 9, 2008 8:30 am}).

A user profile is a representation of one or more characteristics of a user or group of users (e.g., if two or more users are using the same user account in a computing environment). Classification refers to the use of user input information to create a user profile, which can include updating an existing user profile or creating a new user profile. For example, classification can include applying a set of segment rules to user input information to create a user profile that correlates the user with a set of one or more segments or categories defined by the segment rules.

A user profile can include assignments to one or more segments. For example, a segment rule can dictate that if the user searches for "wm6" or "zune" then the user is part of a "gadget seeker" segment. In addition to or instead of such assignments, a user profile can also provide probabilities of the associated user input information correlating to one or more segments. Such probabilities can be expressed in any way that represents the likelihood of the correlation, and such probabilities are not limited to strict statistical probabilities. For example, a segment rule can dictate that if the user searched using automobile-related terms (Ford, Chevrolet, Toyota, Porsche, automobile, etc.) in the last thirty days, then there is a probability of the user profile correlating to a "car lover" segment, with the probability increasing with the number of such terms that are entered. For example, the probability could be represented by a percentage equal to the number of automobile-related terms multiplied by ten, up to a maximum of one-hundred.

The techniques can also include filtering or excluding personal information from use in classification. Personal information is information whose use in classification is limited, such as by sensitivity rules resulting from limiting user input and/or from some other source such as a rules server. For example, sensitivity rules can be received from a server over a global communications network. By way of example, personal information can include personal identifiable information (PII), which is information that can be used by itself or in combination with other available information to identify a particular user. However, some such information may not be defined as personal information in a particular set of sensitivity rules. In addition, personal information can include other information defined by the sensitivity rules, such as information the particular user does not want to share. For example, a user might enter a limiting user input indicating that the user does not want to share user input information including the word "soccer" if the user does not want to share the fact that the user is interested in soccer.

Sensitivity rules can include sensitive user action rules, which can each define one or more personal user action representations that reveal personal information without reference to other user action representations. For example, sensitive user action rules can define user action representations that include words or phrases that reveal PII (name, credit card number, user name, address, etc.), and/or that indicate particular religious affiliations, diseases, or adult-only subject matter. Sensitive user action rules may be installed as a set of rules in a client computing environment, and/or they can be created or altered by a user at the client computing environment.

Sensitivity rules can also include sensitive inference rules, which can each define a pattern of user action representations that reveal personal information when taken together. For example, one such rule could dictate that if a user searches for "stomach ache" and soon after searches for "worms," then delete both of the corresponding user action representations (or delete one of them). As with sensitive user action rules, sensitive inference rules may be installed as a set of rules in a client computing environment, and/or they can be created or altered by a user at the client computing environment.

While the sensitivity rules can dictate that personal information is to be filtered or excluded from use in classification, this can be done in different ways. For example, the personal information can be ignored by a classification module, deleted, quarantined (e.g., stored separately from information used in classification or flagged to be excluded from classification), or generalized. As an example of generalization, if a user entered "Ford" and that was considered to be personal information, then "Ford" could be replaced with "automobile" in a user action representation. Thus, the personal information (Ford) could be filtered out, but some corresponding useful information (automobile) could still be used in classification.

The user input information can be stored in one or more storage devices in the user's computing environment, as can a user profile created by classifying the user input information. When a remote computing environment desires to have the user profile to target the user with personalized information, the user's computing environment can send the profile to the remote computing environment. Accordingly, the user input information can be controlled by the user. In addition, the user can still receive the benefits of targeted information from the remote computing environment. The user could take additional steps to remain anonymous with respect to the remote computing environment, such as by using an anonymous network (e.g., an anonymous network using onion routing). As another alternative, the user could remain somewhat anonymous to some or all remote computing environments by having multiple trusted third party computing environments act as proxies or brokers between the user's computing environment and the remote computing environment(s).

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

Figure 1:
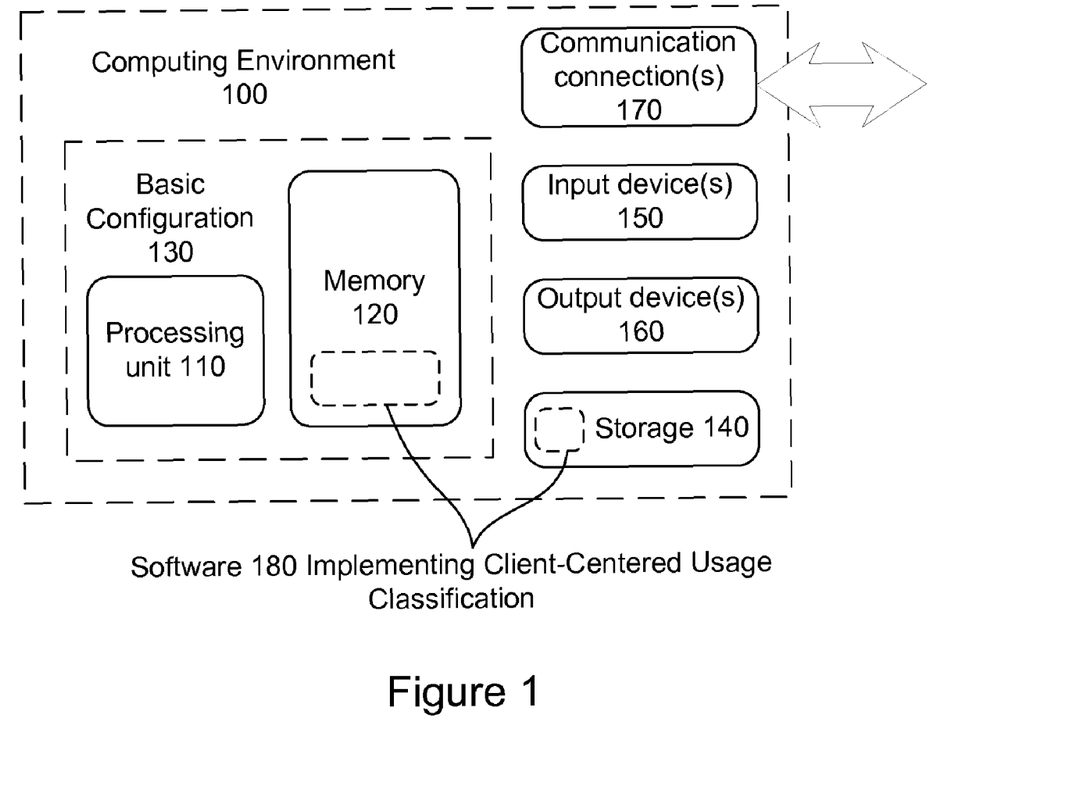
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a client computing environment, a rules source, or a server. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing client-centered usage classification.

Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable and may be arranged as physical or virtual storage units. The storage (140) may include magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "filter," and "send" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Client-Centered Usage Classification System and Environment

Figure 2:
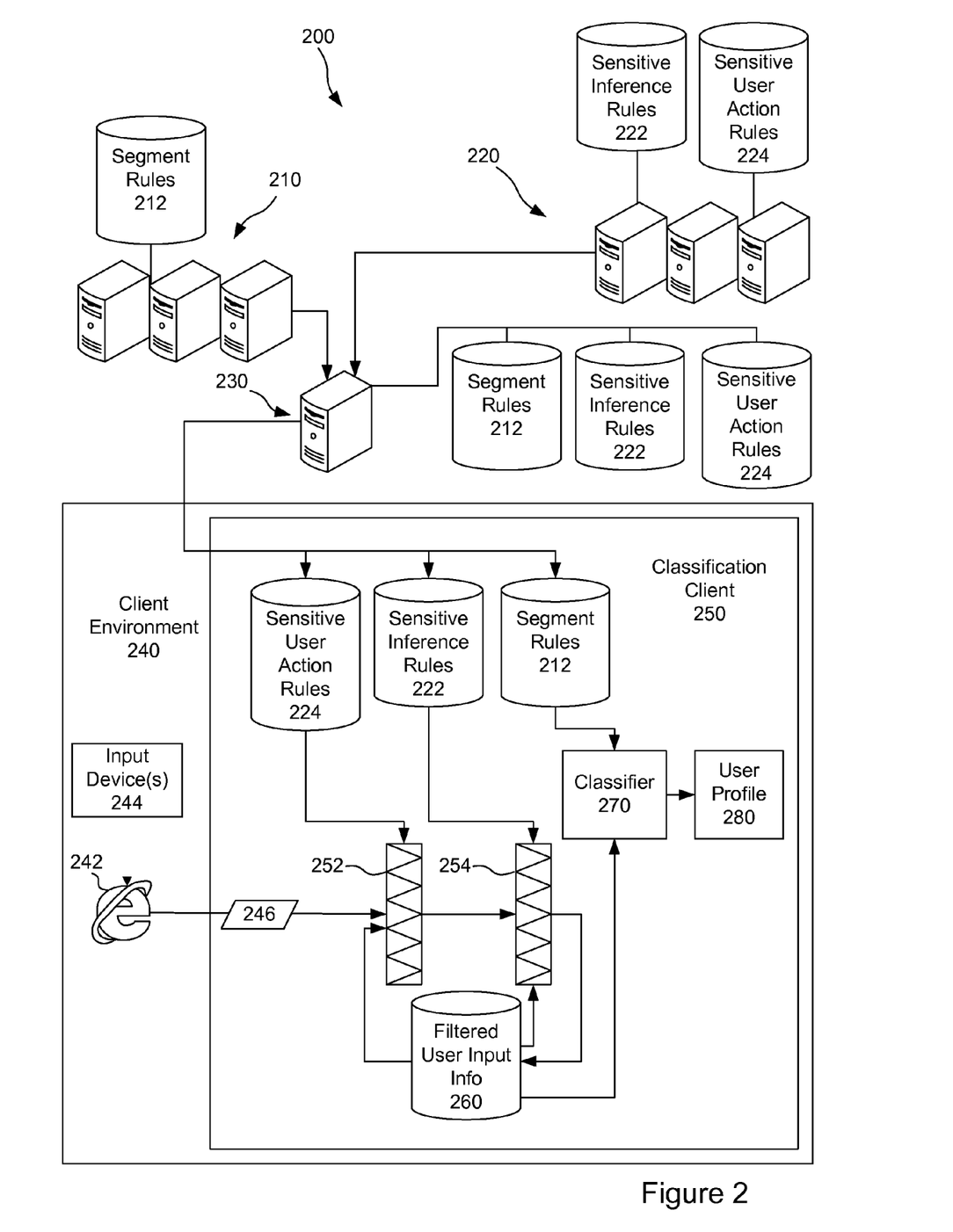
FIG. 2 is schematic diagram of a client-centered usage classification environment.

FIG. 2 is a block diagram of a client-centered usage classification system (200). The classification system (200) can include a segment rules source (210), which can be a computing environment where segment rules (212) are generated and stored in one or more storage devices, such as those described above with reference to FIG. 1.

The classification system (200) can also include a sensitivity rules source (220). The sensitivity rules source (220) can be a computing environment where sensitivity rules, such as sensitive inference rules (222) and sensitive user action rules (224) can be generated and stored in one or more storage devices, such as those described above with reference to FIG. 1.

The classification system (200) can also include a rules server (230), which can be a computing environment that receives the segment rules (212) from the segment rules source (210) and receives the sensitivity rules (222 and 224) from the sensitivity rules source (220) and stores those rules (212, 222 and 224) in one or more storage devices, such as those described above with reference to FIG. 1.

The rules server (230) can send the rules (212, 222, and 224) to a client computing environment (240), which can also be part of the classification system (200). The rules (212, 222, and 224) can be stored in one or more storage devices in the client computing environment (240).

The client computing environment (240) can include one or more input devices (244), such as those described above with reference to FIG. 1. The input device(s) (244) can provide user input actions, which can be processed by the client environment (240) to trigger actions by one or more applications (242), such as one or more browser applications, to perform an action indicated by the user input. For example, the application (242) can request a digital document over a global computer network in a standard manner, such as by sending a HTTP message triggering a search or requesting a particular webpage. The application (242) can pass unfiltered user input information (246) to a classification client (250), which can be a client module that classifies user input information (246). The classification client (250) can be a stand-alone application, or it can be part of one or more other applications, such as a browser application (e.g., Internet Explorer® internet browser, etc.).

The classification client (250) can pass incoming information through a sensitive user action filter (252), which can access and apply the sensitive user action rules (224) to remove personal user input information described by those rules from the unfiltered user input information (246). The classification client (250) can then pass user input information that has not been removed by the sensitive user action filter (252) to a sensitive inference filter (254). The sensitive inference filter (254) can also access filtered user input information (260) that has already been stored in one or more storage devices in the client environment (240), and can access the sensitive inference rules (222) to identify and remove patterns of user input information that can reveal personal information, as defined by the sensitive inference rules (222). The resulting filtered information can be stored with the existing filtered user input information (260) in one or more storage devices in the client environment (240), such as the types of storage devices described above with reference to FIG. 1.

The sensitivity rules (222 and 224) can be updated as newer versions are received from the rules server (230) and/or sensitivity rules are added, deleted, or modified by a user providing input through a user input device at the client environment (240). For example, the client can check for updates from the rules server (230) according to a schedule or when directed to do so by user input. When the sensitivity rules (222 or 224) are updated (and/or according to a schedule, and/or according to some other scheme), the classification client (250) can feed the stored filtered user input information (260) back through the filters (252 and 254) and store the resulting filtered information. In this way, the classification client (250) can filter out existing user input information that did not constitute personal information according to the sensitivity rules (222 and 224) prior to the rules (222 and 224) being updated, but does constitute personal information according to one or more of the sensitivity rules (222 and 224) after the rules (222 and 224) are updated.

The classification client (250) can also include a classifier (270), which can classify the filtered user input information (260). For example, the classifier (270) can determine whether the filtered user input information (260) corresponds to the segments of the segment rules (212). If so, then the classifier (270) can include one or more correlations to corresponding segments in a user profile (280). For example, the correlations can be assignments to corresponding segments (e.g., the user profile can include a listing of segments to which the filtered user input information (260) corresponds). The correlations can also include probabilities that the filtered user input information (260) corresponds to the corresponding segments (e.g., the user profile (280) can include a listing of segments with each segment including a corresponding numerical indicator of the probability that the user input information corresponds to the segment). The user profile (280) can be stored in one or more storage devices in the client environment (240).

The user profile (280) can be passed to one or more server environments (not shown) so that the server environment(s) can provide personalized content to the client environment (240). For example, the personalized content could be personalized advertisements, website news content, RSS feeds, etc.

The filtering and classification can be done in ways other than those described above. For example, the user input information (246) can be stored without being filtered, and it can be filtered as it is passed from storage to the classifier (270). However, storing the user input information (246) without filtering the information first may cause privacy concerns for some users.

The segment rules source (210) can send segment rules discovery queries to the client environment (240) via the rules server (230). These discovery queries can be similar in format to the segment rules (212). The discovery queries may not be stored in a persistent state in the client environment (240), while the rules (212, 222, and 224) typically can be stored in a persistent state in the client environment (240). In addition, the discovery queries can trigger the client environment (240) to immediately classify the filtered user input information (260), produce a segment discovery user profile including correlations to corresponding new tentative segments, and send the segment discovery user profile to the segment rules source (210). The segment rules source (210) can use the segment discovery user profile in determining whether to include the new tentative segments indicated by the discovery query as segments indicated by the segment rules (212). For example, the segment rules source (210) can determine whether enough user profiles correlate to a tentative segment to include a corresponding segment rule in the regular set of segment rules (212).

The segment rules source (210), the sensitivity rules source (220), and the rules server (230) can all be a server computing environments that are connected to one or more computer networks, such as a global computer network (for example, the Internet). Messages and associated data (e.g., rules (212, 222 and 224)) sent between the segment rules source (210), the sensitivity rules source (220), the rules server (230), and the client environment (240) can be sent in standard ways, such as sending HTTP or FTP messages over a global computer network. Of course, other ways of communicating between the various computing environments are also possible. In addition, the roles of the rules sources (210 and 220) and the rules server (230) could all be performed by a single computing environment or by some different combination of computing environments.

III. Example of Using Classifications: Targeted Ad Serving

Figure 3:
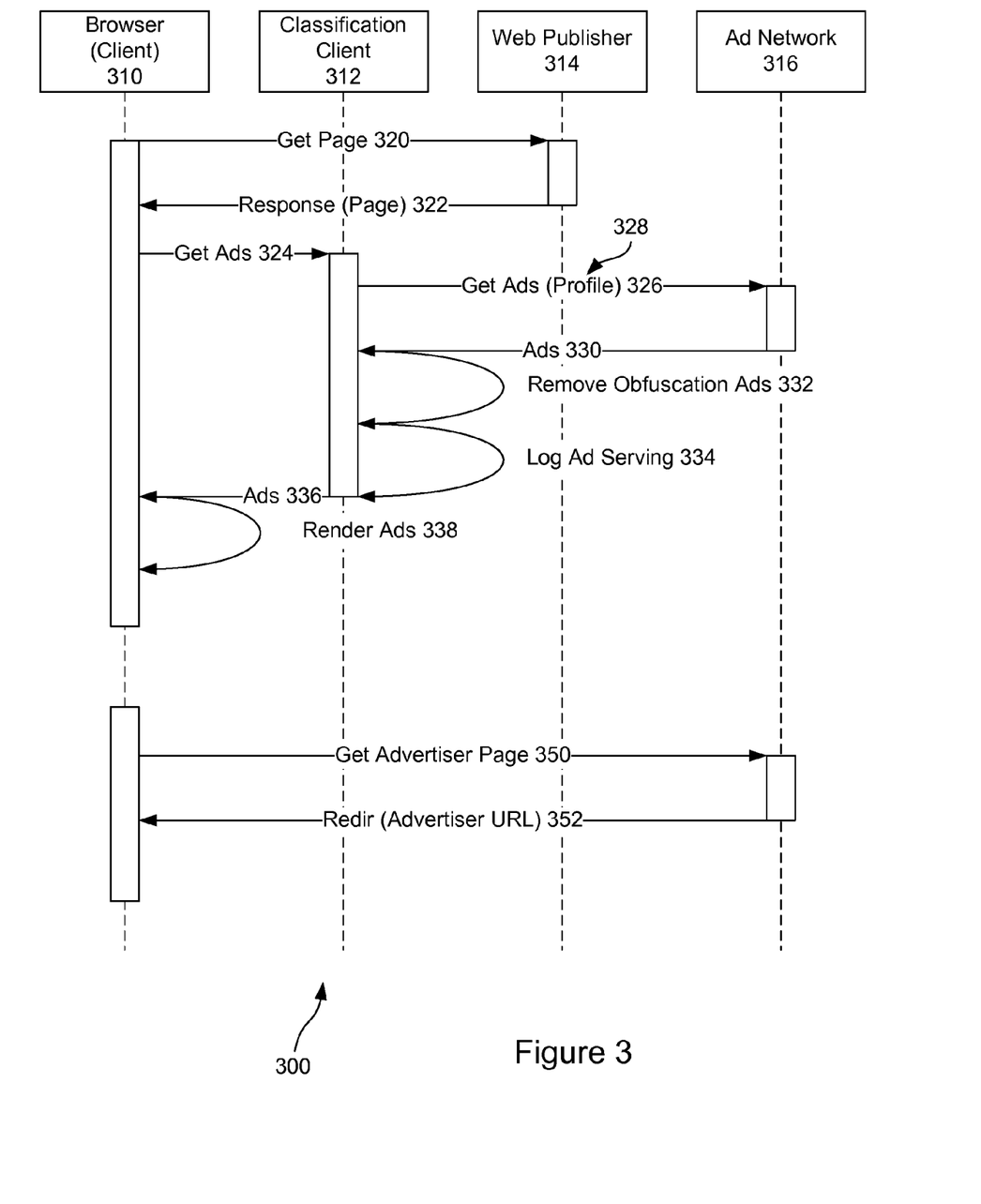
FIG. 3 is a schematic diagram of a technique for using a user profile in interactions between a client browser application, a classification client, a web publisher, and an ad network.

Referring to FIG. 3, a technique (300) for using a profile in interactions between a client browser application (310), a classification client (312) (which may or may not operate the same as the classification client described above with reference to FIG. 2), a web publisher (314), and an ad network (316) will be described.

In response to a user action, the browser application (310) can send a get page request (320), such as a HTTP get request, over a global computer network to a web publisher (314), such as a standard web server. The web publisher (314) can send back a response (322), which can include the requested page. The requested page in the response (322) can include a script, such as a typical script that is included with a HTML page to request advertisements to be rendered with the page. While such scripts typically send an advertisement request directly to an ad network, the script in the response (322) can be executed by a client computing environment running the browser application (310) to send a local get ads request (324) to the classification client (312) in the same computing environment as the browser application (310). For example, the local get ads request (324) can be an application programming interface call to the classification client (312). In response to the local get ads request (324), the classification client (312) can send a remote get ads request (326) to the ad network (316). The remote get ads request (326) can be an appropriate HTTP message or some other type of message.

The remote get ads request (326) can include an obfuscated user profile (328). The obfuscated user profile (328) may be generated with filtered information in some implementations and with unfiltered information in other implementations. The classification client (312) can produce the obfuscated user profile (328) by obfuscating a genuine user profile, such as by including fake user segment correlations in the profile. The fake user segment correlations can indicate segments to which local user input information does not actually correspond. The obfuscated user profile (328) can also include genuine user segment correlations, which can indicate segments to which the local user input information does actually correspond. Alternatively, some other obfuscation technique can be used, or the profile can be sent without any obfuscation.

The ad network (316) can use the obfuscated user profile (328) sent with the remote get ads request (326) to select units of information such as advertisements that correspond to the fake and genuine segments indicated by the correlations in the user profile (328). This can be done in a manner similar to existing techniques for selecting advertisements, such as using ad network classifications for the advertisements and matching them to the correlations in the profile. The ad network (316) may also consider other factors, such as the context of the page sent in the response (322) from the web publisher (314) to the browser application (310). Because the user profile (328) has been obfuscated, the genuine user profile can be masked from the ad network, thereby increasing the privacy of the corresponding user.

The ad network (316) can send the selected advertisements in a remote advertisement response (330), such as an appropriate HTTP message or some other type of message. The remote advertisement response (330) can also include an indication of the segment to which each of the included advertisements corresponds. Upon receiving the remote advertisement response (330) at the client computing environment, the classification client (312) can remove (332) obfuscation advertisements, such as by removing advertisements that correspond to fake segment correlations sent to the ad network (316) in the obfuscated user profile (328). The advertisement serving can then be logged (334) by the classification client, such as by including an entry in a browsing log and/or storing associated user input information to be used in generating future user profiles. The de-obfuscated advertisements can then be passed in a local advertisement response (336) to the browser application (310). For example, this can be done in an application programming interface call. The browser application (310) can render (338) the advertisements in the previously-provided webpage to display the advertisements and the webpage to a user on a computer display device.

If a user selects one of the advertisements by providing user input such as an appropriate mouse click, the browser application (310) can send a get advertiser page message (350), such as a HTTP get request, to the ad network (316). The ad network (316) can respond to the get advertiser page message (350) by sending a redirect message (352) that includes the URL associated with the selected advertiser's website. The browser application (310) can process the redirect message (352) in a standard manner, such as by sending an HTTP get request to obtain the advertiser's webpage.

The browser application (310) and the classification client (312) can be part of a client computer environment, and the web publisher (314) and the ad network (316) can both be server computer environments, all of which can be connected to one or more computer networks, such as a global computer network (for example, the Internet). Messages and associated data discussed above with reference to FIG. 3 can all be sent in standard ways, such as sending HTTP messages over a global computer network or sending application programming interface calls. Of course, other ways of communicating between the various computing environments are also possible.

Alternatively, the locally-maintained profile could be used in other ways to obtain personalized information from a remote computing environment. For example, the profile could be sent to a server to obtain personalized news feeds, etc. Even for obtaining personalized (targeted) advertisements, other scenarios are possible. For example, a web publisher could include advertisements in a webpage before sending the webpage to the client environment.

IV. Techniques for Client-Centered Usage Classification

Figure 4:
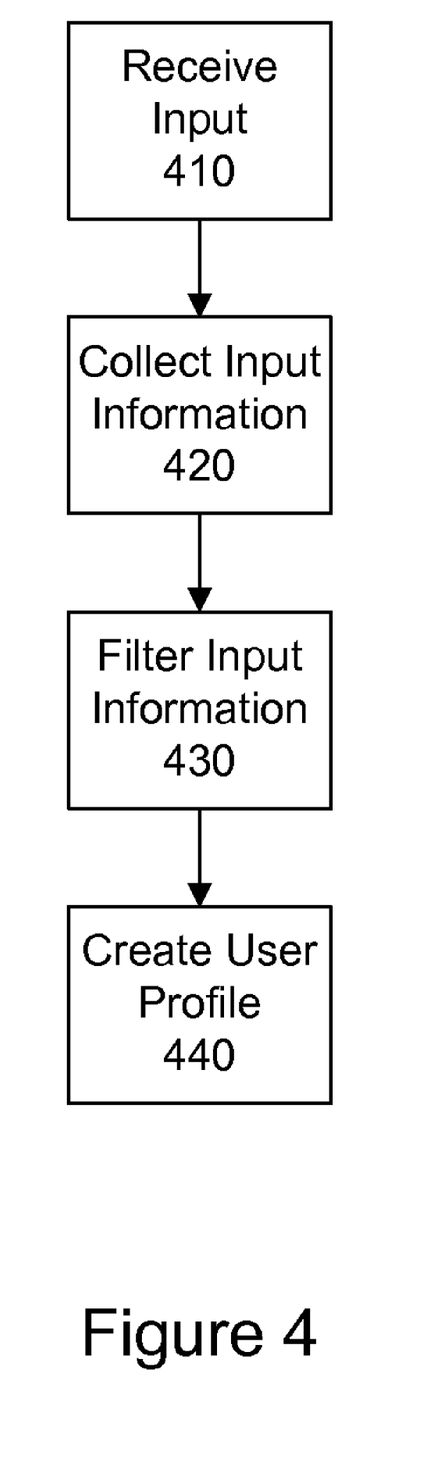
FIG. 4 is a flow diagram of a client-centered usage classification technique.

Referring to FIG. 4, a client-centered usage classification technique will be described. The technique of FIG. 4 and other techniques described herein may utilize the computing environments described above or some other computing environment. In the technique of FIG. 4, user input actions can be received (410), such as from a standard user input device in a client computing environment. For example, the user input actions can be user input actions that result in communication over a network, such as a global computer network, and/or they can be input actions that result in local responses in the client computing environment. Input information about the user input actions (user input information) can be collected (420). For example, the user input information may be passed to a classification client computing component. The user input information can be filtered (430) to separate personal information that is considered personal from non-personal information that is not considered personal. For example, this may be done according to one or more sensitivity rules that are entered by a user and/or received from an external source, such as a rules server computing environment. A user profile can be created (440) using the non-personal information, but not using the personal information. For example, the personal information may be filtered out before the non-personal information is stored in an information silo in the client computing environment. Alternatively, all the user input information can be stored, and the personal information can be filtered out prior to the filtered user input information being classified in a classification technique that generates the user profile.

Figure 5:
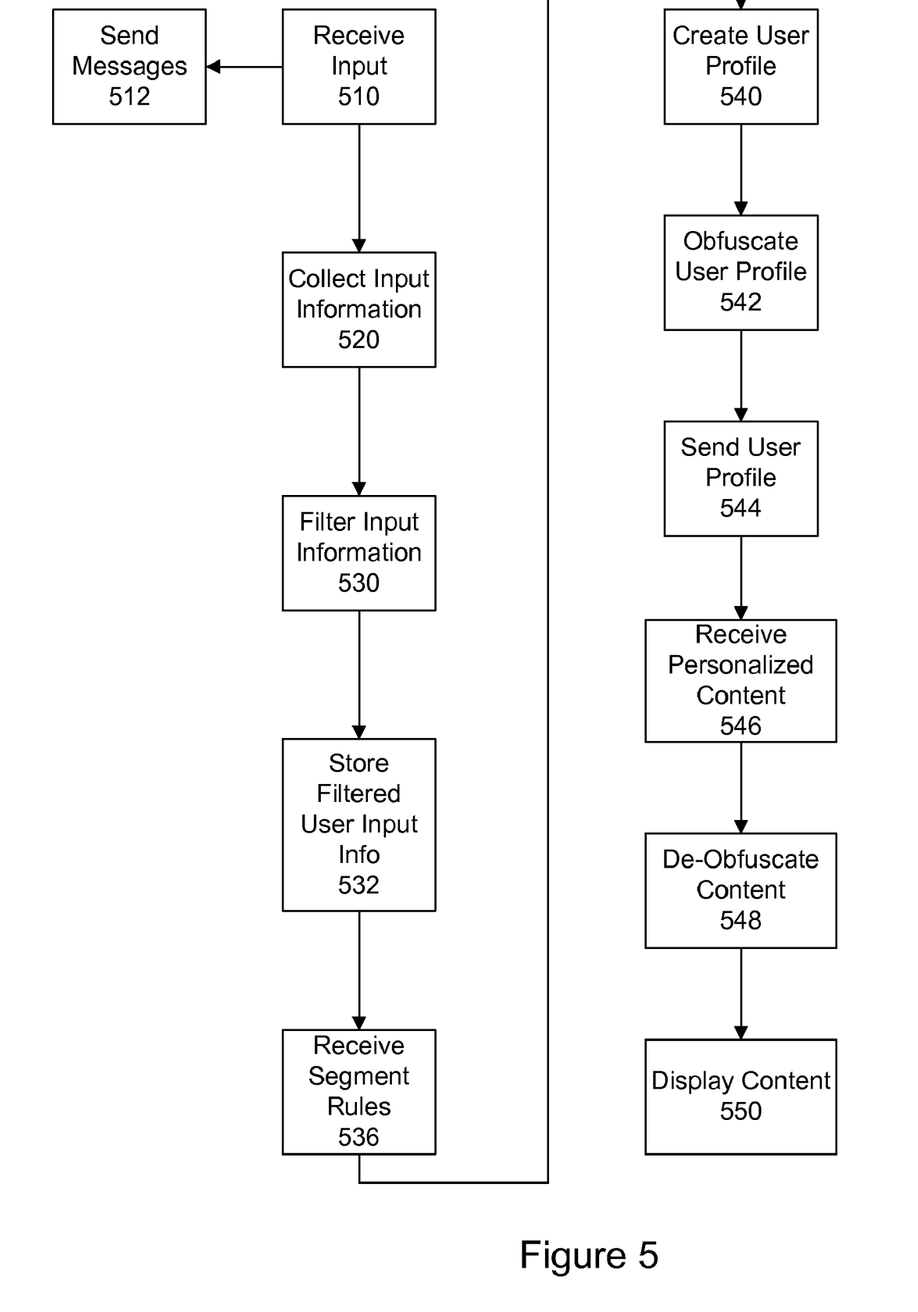
FIG. 5 is a flow diagram of another client-centered usage classification technique.

Referring now to FIG. 5, another client-centered usage classification technique will be discussed. One or more input actions can be received (510), and one or more messages can be sent (512) in response to the received input actions. For example, the messages may be one or more messages sent over a global computer network, such as messages associated with web navigation or searching. Input information about the input actions can be collected (520), and filtered (530) to exclude personal information. The filtered non-personal information can be stored (532), such as in one or more storage devices in a client computing environment where the input is received (510).

One or more segment rules or classification rules can be received (536). For example, the segment rules may describe segments to which the filtered input information can be classified or correlated to create (540) a user profile. The user profile can include one or more correlations between the filtered input information and the segments in the segment rules. In addition, the profile can be obfuscated (542), such as by including one or more fake correlations in the profile along with genuine correlations. The obfuscated user profile can be sent (544) to a remote computing environment. For example, the profile may be sent to a web server at a remote ad network or some other remote content provider.

The remote computing environment can use the profile to select personalized or targeted content to send back to the client computing environment that sent the profile. The client computing environment can receive (546) the personalized content, and can de-obfuscate (548) the personalized content (e.g., removing content that corresponds to fake segments in the obfuscated profile). The de-obfuscated personalized content can then be displayed (550) at the client computing environment, such as by including personalized advertisements or news feeds in a webpage displayed at the client computing environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. One or more computer-readable storage media not consisting of a propagated signal, the one or more computer-readable storage media having computer-executable instructions embodied thereon that, when executed, perform acts comprising:
   receiving user input actions from one or more user input devices at a client computing environment;
   collecting unfiltered user input information about the user input actions at the client computing environment;
   filtering the unfiltered user input information to produce filtered user input information at the client computing environment, the filtered user input information excluding personal information of the unfiltered user input information and including non-personal information of the unfiltered user input information, filtering comprising excluding one or more personal patterns of user action representations, each personal pattern comprising user action representations that reveal personal information when taken together in the pattern; and
   creating a user profile using the filtered user input information.

2. The one or more computer-readable media of claim 1, wherein filtering comprises limiting user input received from one or more user input devices in the client computing environment.

3. The one or more computer-readable media of claim 1, wherein filtering comprises excluding from the filtered user input information one or more personal user action representations that each reveal personal information without reference to other user action representations.

4. The one or more computer-readable media of claim 1, wherein creating a user profile comprises classifying the filtered user input information according to one or more segment rules, and wherein the user profile comprises one or more correlations of the filtered user input information to one or more segments according to the one or more segment rules.

5. The one or more computer-readable media of claim 1, wherein the user profile comprises one or more assignments to one or more segments.

6. The one or more computer-readable media of claim 1, wherein the user profile comprises one or more representations of one or more probabilities of the filtered user input information correlating to one or more segments.

7. The one or more computer-readable media of claim 1, wherein one or more of the user input actions results in information being sent over a global computer network.

8. The one or more computer-readable media of claim 1, wherein creating a user profile comprises classifying the filtered user input information according to one or more tentative segments, and the acts further comprise using the user profile to determine whether to include segment rules corresponding to the one or more tentative segments in a set of segment rules.

9. The one or more computer-readable media of claim 1, wherein the acts further comprise receiving user segment rules from a server computing environment over a global computer network, and wherein creating a user profile comprises classifying the filtered user input information at the client computing environment according to the user segment rules.

10. The one or more computer-readable media of claim 1, wherein the acts further comprise sending the user profile to a server computing environment over a global computer network.

11. The one or more computer-readable media of claim 10, wherein the acts further comprise obfuscating the user profile to generate an obfuscated user profile, and wherein sending the user profile comprises sending the obfuscated user profile.

12. The one or more computer-readable media of claim 1, wherein:
   filtering comprises filtering according to one or more sensitivity rules that define personal information to be excluded from use in creating the user profile;
   the user profile comprises one or more correlations to one or more segments according to one or more segment rules; and
   the acts further comprise:
      sending messages over a global computer network in response to the user input actions;
      sending the user profile to a remote server over the global computer network; and receiving one or more advertisements over the global computer network in response to sending the user profile.

13. A computer-implemented method, comprising:

collecting user input information at a client computing environment, the user input information representing user input actions received from one or more user input devices in the client computing environment;

storing the user input information in one or more storage devices in the client computing environment;

filtering the user input information to produce filtered user input information at the client computing environment, the filtered user input information excluding personal information of the unfiltered user input information and including non-personal information of the unfiltered user input information;

classifying the collected user input information at the client computing environment to create an initial user profile;

obfuscating the initial user profile to create an obfuscated user profile, the initial user profile comprising one or more genuine correlations to one or more segments to which the user input information has been correlated when classifying, and the obfuscated user profile comprising the one or more genuine correlations and one or more fake correlations to one or more segments to which the user input information has not been correlated when classifying; and sending the obfuscated user profile to a server computing environment.

14. The method of claim 13, further comprising:

receiving in response to the obfuscated user profile one or more units of information corresponding to the one or more fake correlations and one or more units of information corresponding to the one or more genuine correlations; and displaying on a display in the client computing environment one or more representations of the one or more units of information corresponding to the one or more genuine correlations, but not displaying representations of the one or more units of information corresponding to the one or more fake correlations.

15. The method of claim 13, the user profile including one or more representations of one or more probabilities of the collected user input information correlating to one or more segments.

16. A computer system comprising:

one or more storage devices storing user input information representing user input actions received from one or more input devices in the computer system;

at least one processor; and memory comprising instructions stored thereon that when executed by at least one processor cause at least one processor to perform acts comprising:

classifying the stored user input information; and excluding personal user input information from being used in classifying the stored user input information, excluding the personal user input information from being used in classifying comprising excluding use of patterns of representations of user actions that when taken together reveal personal user input information.

17. The computer system of claim 16, wherein excluding the personal user input information from being used in classifying comprises generalizing at least a portion of the personal user input information.

18. The computer system of claim 16, wherein classifying comprises applying segment rules to the stored user input information.

* * * * *

UNITED STATES PATENT AND TRADEMARK OFFICE
CERTIFICATE OF CORRECTION

| | | |
|---|---|---|
| PATENT NO. | : 8,166,104 B2 | Page 1 of 1 |
| APPLICATION NO. | : 12/406964 | |
| DATED | : April 24, 2012 | |
| INVENTOR(S) | : Shein et al. | |

It is certified that error appears in the above-identified patent and that said Letters Patent is hereby corrected as shown below:

In the Claims

Column 12, line 13, Claim 3, after "information" insert -- to --.

Signed and Sealed this
Tenth Day of February, 2015

Michelle K. Lee
*Deputy Director of the United States Patent and Trademark Office*